US010243871B1

(12) United States Patent
Patel et al.

(10) Patent No.: US 10,243,871 B1
(45) Date of Patent: Mar. 26, 2019

(54) SYSTEM FOR CONTROLLING USE OF NETWORK RESOURCES BY DEVICES

(71) Applicant: AMAZON TECHNOLOGIES, INC., Seattle, WA (US)

(72) Inventors: Pratik Kalpesh Patel, Sunnyvale, CA (US); Michael Risley, San Francisco, CA (US); Milos Jorgovanovic, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 116 days.

(21) Appl. No.: 15/195,516

(22) Filed: Jun. 28, 2016

(51) Int. Cl.
| | |
|---|---|
| *H04W 4/80* | (2018.01) |
| *H04L 12/26* | (2006.01) |
| *H04W 74/00* | (2009.01) |
| *H04W 84/12* | (2009.01) |
| *H04L 12/911* | (2013.01) |

(52) U.S. Cl.
CPC ........ *H04L 47/746* (2013.01); *H04L 43/0888* (2013.01); *H04L 43/0894* (2013.01); *H04L 43/16* (2013.01); *H04W 4/80* (2018.02); *H04W 74/002* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2005/0120128 A1* | 6/2005 | Willes | ................... | H04N 21/00 709/232 |
| 2008/0056125 A1* | 3/2008 | Kneckt | ................... | H04L 41/00 370/229 |
| 2008/0279138 A1* | 11/2008 | Gonikberg | ............ | H04W 8/005 370/328 |
| 2009/0067448 A1* | 3/2009 | Stanwood | ............. | H04L 12/413 370/447 |
| 2012/0163181 A1* | 6/2012 | Xue | ...................... | H04W 52/24 370/241 |
| 2013/0236032 A1* | 9/2013 | Wakeland | ............. | G10L 19/002 381/104 |

* cited by examiner

*Primary Examiner* — Christopher M Crutchfield
*Assistant Examiner* — Alan L Lindenbaum
(74) *Attorney, Agent, or Firm* — Lindauer Law, PLLC

(57) ABSTRACT

Described are techniques for improving the performance of a first device that uses a first communication protocol by modifying the audio data rate associated with a second device that uses a second communication protocol. Data indicative of access and use of a communication channel by the first device may indicate a level of use associated with a communication channel or a level of channel resources used by the first device. If the parameters determined from the access data deviate from one or more threshold values, the audio data rate of the second device may be modified to change the quantity of resources used by the second device.

20 Claims, 6 Drawing Sheets

SYSTEM FOR CONTROLLING USE OF NETWORK RESOURCES BY DEVICES

BACKGROUND

In some systems, multiple devices may communicate using a single communication channel. The activities of certain devices may use resources of the communication channel, restricting the resources available for use by other devices.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
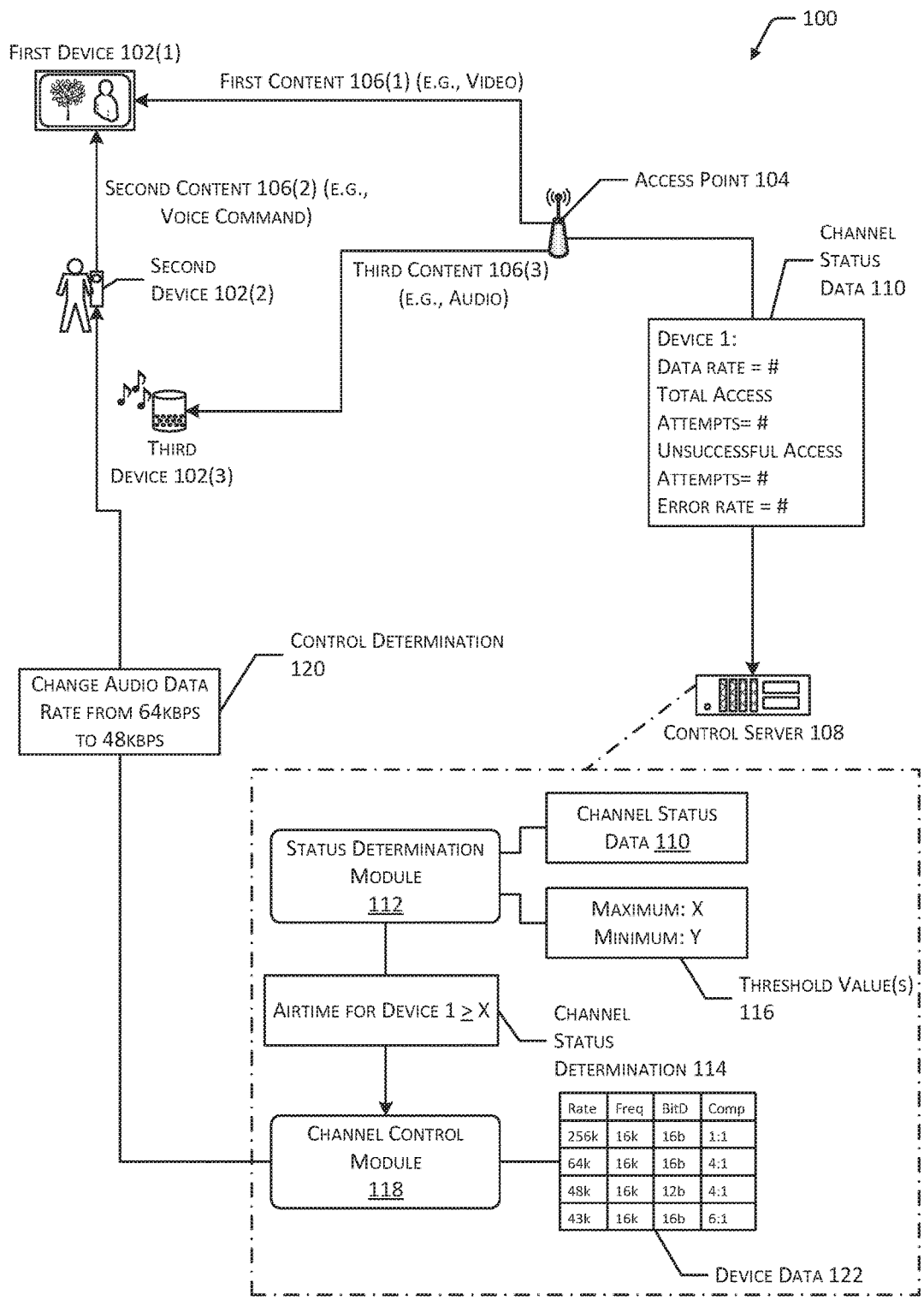
FIG. 1 depicts a system for modifying the audio data rate of one or more devices based on data associated with use of a communication channel by other devices.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

In a wireless environment, multiple devices may often communicate using the same networks, access points, communication channels, and other resources. For example, in a typical consumer electronics product, multiple wireless technologies may share a common radio resource. Continuing the example, a wireless chipset may include a die, antenna, and radio frequency (RF) chain that are shared by Wi-Fi, Bluetooth, and Bluetooth Low Energy technologies. In some cases, each of these technologies may simultaneously attempt to access shared resources. As another example, Wi-Fi technology may be used to provide video content to a television. Simultaneously, audio content to accompany the video content may be provided, using Bluetooth technology, to one or more sound devices. A controller adapted to receive audio commands from a user (e.g., a "voice remote") may be used to control the television, sound device(s), or one or more other devices in the environment. The controller may communicate using Bluetooth Low Energy technology. During times when a communication channel is experiencing heavy use, one or more of the technologies competing for channel resources may fail to access sufficient resources to provide an adequate user experience. For example, during times when insufficient resources are accessible by a device, video content provided using Wi-Fi technology may be interrupted, or audio content provided using Bluetooth technology may include audible stuttering or other audible irregularities. The ability to control the amount of resources used by various technologies may be limited. For example, a communication channel used by multiple devices may be limited regarding the total quantity of time that data may be broadcast using the channel (e.g., channel airtime). The airtime used by a device may be measured as a fixed value or as a percentage of total available airtime. The channel airtime used by Wi-Fi or Bluetooth technologies to transmit data may be determined primarily by factors outside the direct control of a user, such as the characteristics of the equipment used, the activity of the network access point, the conditions of the communication channel, and so forth. For example, transmission of 10 Mbps of throughput for a first device may use 10 percent of available channel airtime while transmission of the same 10 Mbps of throughput using a different device may use 25 percent of the available channel airtime, due to characteristics specific to each device.

Described in this disclosure are techniques for changing the audio data rate of a device that communicates using a protocol for transmitting audio data, based on the determined channel airtime needs of one or more other devices or based on the conditions of a communication channel, such as use or congestion, signal-to-noise ratio, and so forth. For example, a Wi-Fi device, a Bluetooth device, and a Bluetooth Low Energy device may each share resources present on a wireless chipset and may each communicate using a fixed quantity of bandwidth available to the chipset. Use of resources by the Bluetooth Low Energy device may affect the resources available to other devices, which may result in an adverse user experience, such as intermittent or poor-quality video provided by a Wi-Fi display device. However, decreasing the resources used by the Bluetooth Low Energy device, such as by changing an audio data rate associated with the transmission of audio data by the device, may increase the resources available to other devices. In some cases, decreasing the audio data rate associated with a Bluetooth Low Energy device may not negatively impact a user experience associated with the Bluetooth Low Energy device. For example, decreasing an audio data rate of a Bluetooth Low Energy voice controller from 64 kbps to 43 kbps may not significantly affect the accuracy with which user voice commands are processed.

In some implementations, the airtime or other channel resources used by a device at a particular time, such as a device using a Wi-Fi protocol, may be determined based on one or more factors, such as the data rate of the device, a count of unsuccessful attempts and total attempts by the device to access a communication channel, the physical data transfer rate for the device (e.g., Modulation and Coding Scheme (MCS)), the data throughput for the device, or the packet error rate (PER) for the device. If the channel resources used by the device equal or exceed a threshold value, the audio data rate for one or more other devices may be decreased. For example, a threshold value may include a maximum quantity of airtime for a first device. If the airtime used by the first device equals or exceeds the threshold value, the audio data rate for a second device may be reduced to increase the airtime available to the first device.

In other implementations, a level of use for a communication channel may be determined based on channel access data, such as a clear channel access register or a similar log associated with a device that uses a Wi-Fi protocol. The level of use of the communication channel may indicate a quantity of airtime (e.g., bandwidth) of the channel that is currently being used by one or more of the devices. For example, the channel access data may indicate a count of unsuccessful (e.g., failed) attempts, by the device, to access the channel, as well as a total count of attempts to access the channel (e.g., both unsuccessful and successful access attempts). The ratio of the count of unsuccessful attempts to the total count of attempts may indicate a level of use or congestion of the communication channel. If the level of use equals or exceeds a threshold value, the audio data rate of another device that uses the communication channel, such as a device using the Bluetooth Low Energy protocol, may be decreased to reduce the channel resources used by the other device. For example, the threshold value may include a minimum or maximum count of unsuccessful attempts by a Wi-Fi device to send or receive data or a minimum or maximum ratio of unsuccessful attempts to a total count of attempts. Responsive to determining that the level of use exceeds the threshold value, the data compression ratio of data transmitted by the Bluetooth Low Energy device may be increased, the sampling frequency of data transmitted by the device may be decreased, or the bit depth (e.g., the number of bits per sample) of the data transmitted by the device may be decreased, to reduce the audio data rate of the other device. For example, the Bluetooth Low Energy device may typically transmit audio data at a rate of 64 kilobits per second (kbps) using a compression ratio of 4:1. Increasing the compression ratio from 4:1 to 6:1 may decrease the audio data rate to 43 kpbs and decrease the channel airtime used by the Bluetooth Low Energy device by up to 40%.

Reducing the channel resources used by one or more other devices may increase the resources available to a Wi-Fi device or another device that may produce an adverse user experience if affected by a lack of resources. At a subsequent time, if the level of use of the communication channel falls below a threshold minimum value, the audio data rate(s) of the other device(s) may be restored to previous value(s) or otherwise increased. For example, if the airtime used by a device or the ratio of the count of unsuccessful attempts to the total count of attempts falls below a threshold minimum value, this may indicate that the level of use associated with the communication channel is no longer elevated, and the Wi-Fi device, or another device, no longer requires additional channel resources. Based on this determination, the audio data rate of the device for which the audio data rate was reduced may be increased to its original value, or to another value greater than the current audio data rate.

FIG. 1 depicts a system 100 for modifying the audio data rate of one or more devices 102 based on data associated with use of a communication channel by other devices 102. Multiple devices 102 in an environment may communicate with other devices 102 in the environment using one or more networks. The devices 102 may also communicate with servers and other devices external to the environment using the same networks or other networks. For example, FIG. 1 depicts a first device 102(1), a second device 102(2), and a third device 102(3) within an environment. The first device 102(1) may include a television, in communication with an access point 104, that receives first content 106(1), such as video data, from a remote source, such as a content server in communication with the access point 104. The second device 102(2) may include a voice controller that may be used to receive second content 106(2), such as voice commands from a user, and provide audio data indicative of the voice commands to the first device 102(1), or to other devices in the environment, such as the third device 102(3). In some implementations, the second content 106(2) may be provided, via the first device 102(1), to the content server or another remote device. The third device 102(3) may include a sound device that receives third content 106(3), such as audio data, from the remote source. While FIG. 1 depicts the devices 102 including a television, sound devices, and voice controller as example devices 102, in other implementations, any number and any type of devices 102 capable of wireless communication may be used without departing from the scope of the present disclosure. For example, usable devices 102 may include smartphones or other mobile devices, set-top boxes, tablet computers, personal computers, wearable computers, automotive computers, servers, and so forth.

One or more of the devices 102 may communicate with the access point 104 or with other devices 102 using different protocols, standards, and so forth. For example, the first device 102(1) may communicate using a Wi-Fi protocol that corresponds at least in part to section 802.11 of the specifications set forth by the Institute of Electrical and Electronics Engineers (IEEE). The second device 102(2) may communicate using a Bluetooth Low Energy protocol that corresponds at least in part to section 802.15.1 of the IEEE specifications or one or more of the specifications set forth by the Bluetooth Special Interest Group. The third device 102(3) may communicate using a Bluetooth protocol that corresponds at least in part to one or more of the specifications set forth by the Bluetooth Special Interest Group. In some cases, multiple devices 102 may use the same components (e.g., dies, antennae, RF chains) or the same resources (e.g., airtime of a communication channel). For example, a wireless communication chipset may be configured to enable Wi-Fi, Bluetooth, and Bluetooth Low Energy communication using a single antenna and RF chain. As another example, as shown in FIG. 1, multiple devices 102 may communicate using the same networks and resources.

During times when the communication channel is subjected to heavy use or when the resources needed by a particular device to provide content 106 are significant, one or more of the devices 102 may be unable to receive sufficient airtime, or other resources, to properly receive and output content 106. For example, when each of the depicted devices 102, and possibly other devices 102 within the environment, simultaneously attempt to access the communication channel, the first device 102(1) may be unable to continue receiving and outputting video content 106(1). The lack of resources available to the first device 102(1) may result in an interruption in the content 106(1) or a reduction in the quality thereof. For example, responsive to a lack of resources, the first device 102(1) may cease outputting video content 106(1) with a resolution of 1080p and begin outputting the video content 106(1) with a lower resolution. FIG. 1 illustrates a control server 108 in communication one or more of the devices 102, which may be used to control the allocation of channel resources, such as airtime, to the devices 102, such as by modifying the audio data rate of the second device 102(2). While FIG. 1 depicts the control server 108 as a single computing device, in other implementations, the control server 108 may include any number or type of computing device(s). Additionally, while FIG. 1 depicts the control server 108 as a separate computing device remote from the devices 102 in the environment, in other implementations, one or more of the functions described with regard to the control server 108 may be performed by one or more of the devices 102, the access point 104, or another device 102 in communication with the devices 102 or the access point 104, such as a content server. Further, while FIG. 1 depicts the control server 108 communicating with one or more of the devices 102 via the access point 104, in other implementations, the control server may communicate directly with one or more devices 102 or may include a virtual server that is executing on one or more of the devices 102.

The control server 108 may determine channel status data 110 from the access point 104 or from one or more of the devices 102 in communication with the access point 104. The channel status data 110 may indicate various conditions associated with the communication channel or one or more of the devices 102 accessing the communication channel. For example, the channel status data 110 may include a clear channel access register associated with the first device 102(1), which may indicate a total count of attempts by the first device 102(1) to access the communication channel and a count of unsuccessful attempts (e.g., failures) by the first device 102(1) to access the communication channel. The ratio of failures to the total count of access attempts may indicate a level of use associated with the communication channel. For example, during a high level of use of the communication channel, the count of failed access attempts associated with the first device 102(1) may be greater than the count of failed access attempts during a time of less use. In other implementations, the channel status data 110 may include data such as a physical data rate (e.g., MCS) of a device 102, a data rate of a device 102 such as a video data rate for a Wi-Fi display device, a data throughput of a device 102, a packet error rate of a device 102, or other types of data indicative of the status of one or more of the devices 102.

A status determination module 112 may generate a channel status determination 114 based at least in part on the channel status data 110 and one or more threshold values 116. For example, the threshold value(s) 116 may indicate minimum or maximum values associated with the amount of airtime used by the first device 102(1) at a particular time. As another example, the threshold value(s) 116 may indicate minimum or maximum values associated with the ratio of unsuccessful access attempts by a device 102 to total access attempts by the device 102. Continuing the example, the channel status data 110 may be used to determine a value indicating the channel airtime associated with transmission of content 106 to or from the first device 102(1). The threshold value(s) 116 may include a maximum airtime value (e.g., "X") and a minimum airtime value (e.g., "Y"). Based on the channel status data 110 and the threshold value(s) 116, the status determination module 112 may generate a channel status determination 114 indicating that the airtime use of the first device 102(1), determined from the channel status data 110, equals or exceeds a threshold value 116. In other implementations, the channel status determination 114 may indicate that the airtime use of the first device 102(1) is less than or equal to a minimum threshold value 116.

Based on the channel status determination 114, a channel control module 118 associated with the control server 108 may generate a control determination 120 to modify the channel resources used by one or more of the devices 102. For example, during a high level of use of the communication channel or a time when the airtime used by one or more of the devices 102 is significant, indicated by the channel status determination 114, the control determination 120 may include a signal or instructions to cause the second device 102(2) to decrease the audio data rate associated with the second content 106(2). Decreasing the audio data rate of the second device 102(2) may decrease the airtime or other channel resources used by the second device 102(2), which may increase the resources available to the first device 102(1) and other devices 102. The control determination 120 may be determined at least in part using device data 122 indicative of one or more characteristics of the device 102 to be affected by the control determination 120.

For example, FIG. 1 depicts the device data 122 as a look-up table corresponding to the second device 102(2). The look-up table includes multiple audio data rates (e.g., "Rate"), each corresponding to an associated sampling frequency (e.g., "Freq"), bit depth (e.g., "BitD"), and compression ratio (e.g., "Comp"). Responsive to a channel status determination 114 indicating that a maximum threshold value 116 has been exceeded, the channel control module 118 may cause the second device 102(2) to configure the sampling frequency, bit depth, and compression ratio based on values indicated in a successive row of the look-up table (e.g., a row indicating a lesser audio data rate). In other implementations, responsive to the channel status determination 114, the channel control module 118 may cause the second device 102(2) to configure the sampling frequency, bit depth, and compression ratio based on values indicated in a preceding row of the look-up table (e.g., a row indicating a greater audio data rate). For example, an audio data rate of 64 kbps may be obtained using a sampling frequency of 16 kHz, a bit depth of 16 bits per sample, and a compression ratio of 4:1. Changing the compression ratio from 4:1 to 6:1 while retaining the sampling frequency and bit depth at 16 kHz and 16 bits, respectively, may reduce the audio data rate from 64 kbps to 43 kbps. In still other implementations, the device data 122 may include other types of information indicative of the manner in which one or more settings, configurations, or activities of a device 102 may be modified to reduce the channel resources used by the device 102.

Figure 2:
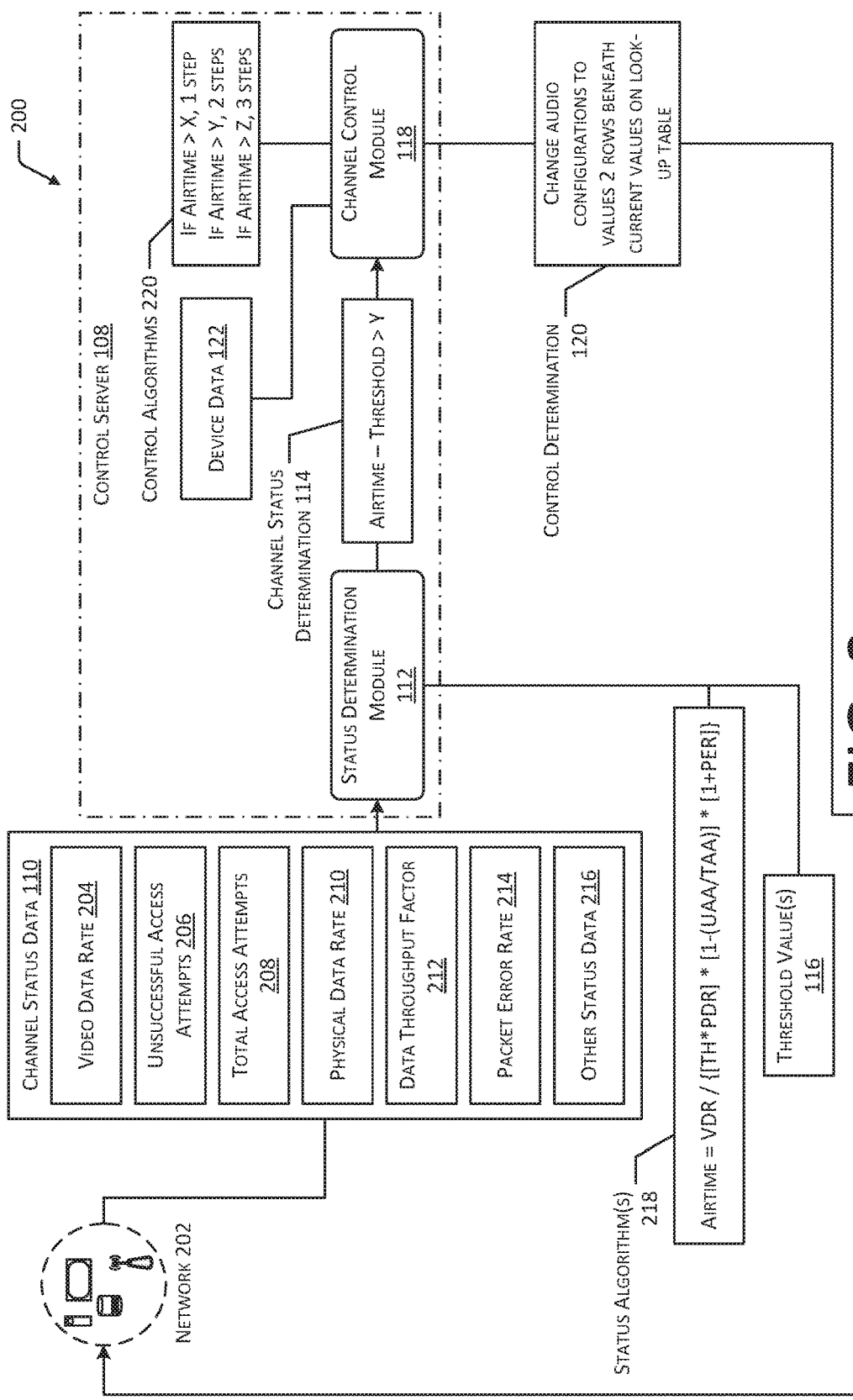
FIG. 2 depicts a system for determining a manner in which to modify audio configurations of a device based on data indicative of airtime used by other devices.

FIG. 2 depicts a system 200 for determining a manner in which to modify audio configurations of a device 102 based on data indicative of airtime used by other devices 102. As described with regard to FIG. 1, one or more devices 102, access points 104, and so forth, may communicate with one another and with one or more servers or other remote devices 102 using one or more networks 202. Each device 102 may communicate using various wireless protocols, standards, and so forth, such as Wi-Fi, Bluetooth, or Bluetooth Low Energy protocols. A status determination module 112 associated with a control server 108 may determine channel status data 110 from one or more devices 102 in the network 202. As described with regard to FIG. 1, while a separate control server 108 is depicted, in other implementations, one or more functions described with regard to the control server 108 may be performed by one or more of the devices 102 associated with the network(s) 202. In some implementations, the status determination module 112 may generate a channel status determination 114 indicative of channel resources used by a particular device 102 or group of devices 102 at a particular time. For example, the channel status determination 114 may indicate the channel airtime used by a television providing high-resolution video content using a Wi-Fi protocol over a particular span of time, such as one-hundred milliseconds.

The channel status data 110 may include data indicative of one or more characteristics or parameters of the particular device 102 that may be used to determine the airtime, or other channel resources, used by the device 102. For example, for a Wi-Fi device 102 providing video content 106, the channel status data 110 may indicate the video data rate 204 (e.g., "VDR") for the device 102, a count of unsuccessful access attempts 206 (e.g., "UAA") for the device 102, a count of total access attempts 208 (e.g., "TAA") for the device 102, a physical data rate 210 (e.g., "PDR") for the device 102, a data throughput factor 212 (e.g., "TH") that may be used to determine the data throughput of the device 102, and the packet error rate 214 (e.g., "PER") of the device 102. Other status data 216 may include characteristics or parameters of other devices 102 or other protocols, such as a Bluetooth re-transmission rate, switching times for transitioning between Wi-Fi, Bluetooth, and Bluetooth Low Energy transmission for a device 102, access attempts for other devices 102, airtime or other resources used by other devices 102, and so forth. For example, channel status data 110 associated with a Bluetooth device 102 may include parameters different than those associated with a Wi-Fi device 102, such as a Bluetooth re-transmission rate. Other status data 216 may also include other data indicative of conditions of a communication channel, such as a signal-to-noise ratio. In some implementations, one or more threshold value 116 may correspond to the signal-to-noise ratio of a communication channel. For example, if the signal-to-noise ratio of the communication channel exceeds a threshold value 116, the noise may interfere with the proper functioning of various devices 102 or the ability of one or more devices 102 to access channel resources. Based on this determination, the audio data rate of one or more devices 102 may be decreased to increase the channel resources available to other devices 102.

The channel status determination 114 may be generated based at least in part on one or more status algorithms 218 and one or more threshold values 116. For example, a status algorithm 218 may indicate a manner in which channel airtime used by a particular device 102 at a particular time may be determined based on at least a portion of the channel status data 110. Continuing the example, FIG. 2 depicts a status algorithm 218 indicating an equation for determining airtime used by a Wi-Fi device 102 providing video content 106 that includes the video data rate 204, data throughput factor 212, physical data rate 210, count of unsuccessful access attempts 206, count of total access attempts 208, and packet error rate 214, as indicated in equation 1, below:

$$\text{Airtime} = VDR / \{[TH*PDR]*[1-(UAA/TAA)]*[1+PER]\} \quad \text{(Equation 1)}$$

Specifically, the example status algorithm 218 associates the video data rate 204 with the data throughput (determined based on the data throughput factor 212 and the physical data rate 210), the ratio of the unsuccessful access attempts 206 to total access attempts 208, and the packet error rate 214. The status determination module 112 may periodically or continuously determine the airtime used by one or more devices 102 based on the status algorithm(s) 218 and channel status data 110. For example, the status determination module 112 may be configured to determine the airtime associated with one or more devices 102 once per one-hundred milliseconds. Based on one or more threshold values 116, the status determination module 112 may generate a channel status determination 114 indicative of the relationship between the determined airtime for a device 102 and one or more corresponding threshold values 116. For example, the threshold values 116 may include multiple thresholds, and the relationship between the determined airtime and certain threshold values 116 may affect the manner in which the audio data rate of a device 102 is modified. Continuing the example, the threshold values 116 may include a first threshold (e.g., "X"), a second threshold (e.g., "Y") greater than the first threshold, and a third threshold (e.g., "Z") greater than the second threshold. The channel status determination 114 may indicate that the determined airtime is greater than the first and second thresholds (e.g., "Airtime−Threshold>Y"), but less than the third threshold, by determining the difference between the determined airtime and one or more of the threshold values 116.

The channel control module 118 may generate a control determination 120 based on the channel status determination 114 and one or more control algorithms 220. The control algorithms 220 may indicate the manner in which a device 102 characteristic may be modified based on the relationship between the determined airtime and one or more of the threshold values 116. For example, as described with regard to FIG. 1, one implementation of device data 122 may include a look-up table that includes sets of device parameters that correspond to particular audio data rates. The control algorithms 220 may indicate that if the determined airtime exceeds a first threshold, the audio data rate for a device 102 may be decreased in a first manner. For example, the control algorithms 220 may indicate that the audio data rate may be decreased by setting the parameters for the device 102 based on the values in the look-up table that are located one row beneath the current value for the audio data rate (e.g., "If airtime>X, 1 step"). If the determined airtime exceeds a second threshold, the audio data rate may be decreased by setting the parameters using values located two rows beneath the current value (e.g., "If airtime>Y, 2 steps"). If the determined airtime exceeds a third threshold, the audio data rate may be decreased by setting parameters using values located three rows beneath the current value (e.g., "If airtime>Z, 3 steps"). In other implementations, the device data 122 may include other types of data indicative of the manner in which the parameters of a device 102 may be modified, rather than a look-up table. The control algorithms 220 may include rules for configuring the audio data rate of a device that correspond to the particular content of the device data 122. For example, the control algorithms 220 may indicate that if a first threshold value 116 is exceeded, the compression ratio of audio data transmitted by a device 102 may be modified, while if a second threshold value 116 is exceeded, the bit depth of the audio data transmitted by the device 102 may be modified.

In other implementations, other status algorithms 218 may be used to determine other characteristics associated with one or more devices 102 or with the communication channel. For example, the ratio of unsuccessful access attempts 206 to total access attempts 208 may indicate a level of use associated with a communication channel, which may function as an indirect indication of the airtime allocated to one or more of the devices 102. The relationship between the ratio of unsuccessful access attempts 206 to total access attempts 208 and one or more threshold values 116 may be used to generate a control determination 120.

Figure 3:
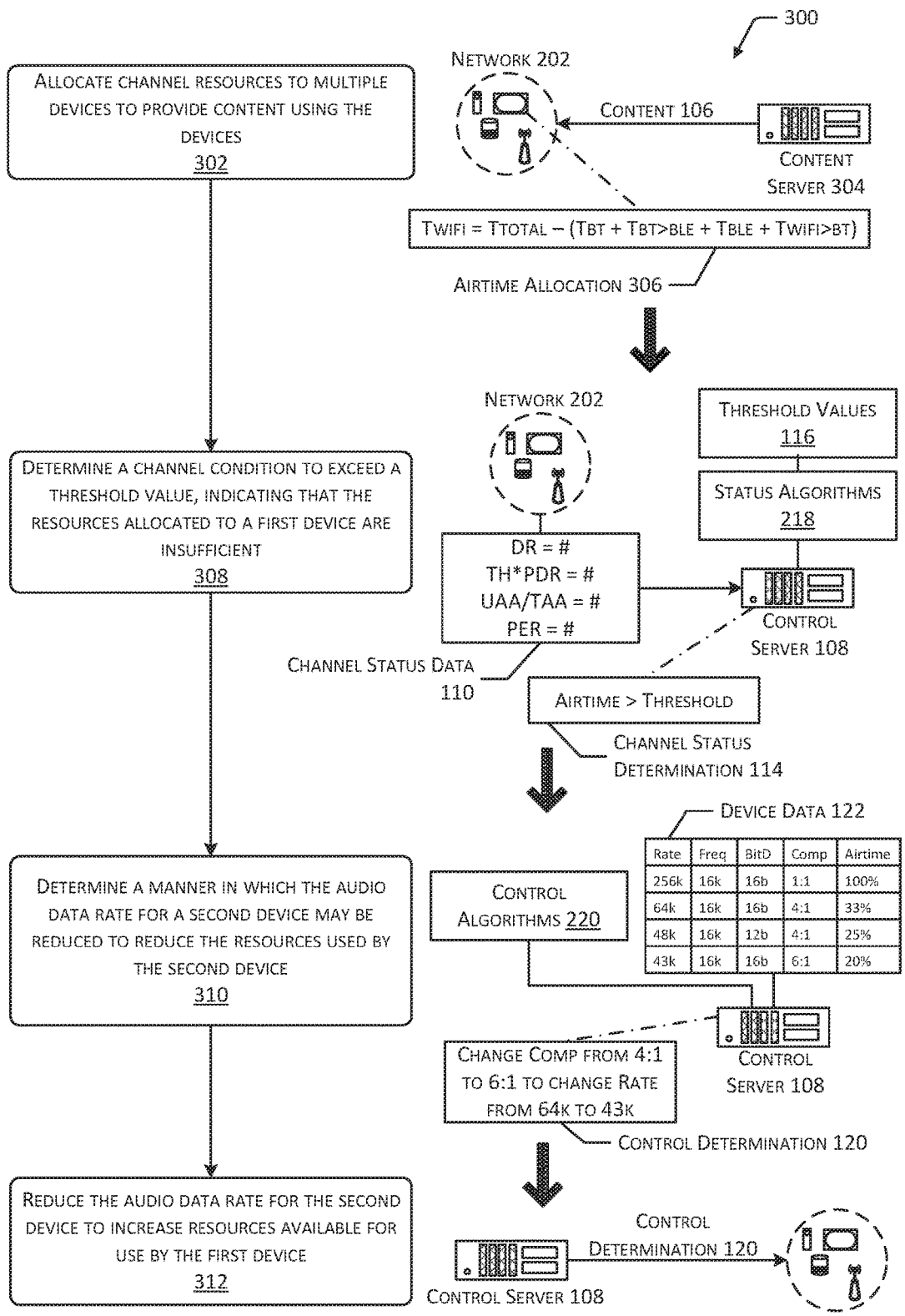
FIG. 3 depicts a scenario illustrating a method for modifying the audio data rate of a device based on a determined condition of a communication channel.

FIG. 3 depicts a scenario 300 illustrating a method for modifying the audio data rate of a device 102 based on a determined condition of a communication channel. At 302, channel resources, such as airtime, may be allocated to multiple devices 102 within a network 202 to provide content 106 using the devices 102. For example, the content 106 may include one or more of audio data, video data, alphanumeric data, and so forth. Each of the devices 102 may communicate using various protocols. For example, a smart television may receive video data from a content server 304 using a Wi-Fi protocol, a wireless speaker may receive audio data from the content server 304 using a Bluetooth protocol, and a voice remote for controlling one or more devices 102 within the network 202 may provide audio data indicative of voice commands to one or more other devices 102 using a Bluetooth Low Energy protocol. An access point 104, one or more of the devices 102 within the network 202, or a server or other computing device in communication with the network 202 may determine an airtime allocation 306 for allocating airtime of the communication channel. For example, FIG. 3 depicts an example airtime allocation 306 associated with the airtime allocated to a Wi-Fi device 102. In other implementations, other determinations may be made for allocation of other channel resources. For example, the total airtime for a channel (e.g., "Ttotal") may be determined based on the total airtime used by Wi-Fi devices 102 (e.g., "Twifi"), the total airtime used by Bluetooth devices 102 (e.g., "Tbt"), the total airtime used by Bluetooth Low Energy devices 102 (e.g., "Tble"), and the times required to switch between different protocols, as indicated in equation 2 below. Switching times may include times required to switch between Bluetooth and Bluetooth Low Energy (e.g., "Tbt>ble"), between Wi-Fi and Bluetooth (e.g., "Twifi>bt"), and between Wi-Fi and Bluetooth Low Energy (e.g., "Twifi>ble").

$$Ttotal=Twifi+Twifi>bt+Tbt+Tbt>ble+Tble \quad \text{(Equation 2)}$$

In some cases, the switching times between protocols may be known constants, based on the hardware or software associated with operation of a communication chipset or another set of components. The airtime allocated to devices 102 that use a Bluetooth protocol may be determined based on the packet characteristics of the transmitted data and the Bluetooth retransmission rate for the devices 102. The airtime allocated to devices 102 that use a Bluetooth Low Energy protocol may be determined based on the audio data rate associated with the devices 102. For example, the audio data rate may be affected by one or more of the sampling frequency, bit depth, and compression ratio of the devices 102. Devices 102 that use a Wi-Fi protocol may typically access the channel airtime that remains after determining the switching times and the airtime allocations for Bluetooth and Bluetooth Low Energy devices 102, as indicated in equation 3 below:

$$Twifi=Ttotal-(Tbt+Tbt>ble+Tble+Twifi>bt) \quad \text{(Equation 3)}$$

During times of heavy use for a communication channel or times when the airtime associated with use of a device 102 using a Wi-Fi protocol is significant, the user experience associated with the Wi-Fi device 102 may degrade. The degradation associated with the Wi-Fi device 102 may be perceived prior to a perceived degradation in the user experience associated with other devices 102, such that the status of the Wi-Fi device 102 may be used as an indicator to modify the audio data rate for another device 102. At 308, a channel condition may be determined to exceed a threshold value 116, indicating that the resources allocated to a first device 102(1) are insufficient. For example, based on the airtime used by one or more Bluetooth or Bluetooth Low Energy devices 102, a Wi-Fi device 102 may receive insufficient channel airtime to provide an acceptable user experience. Continuing the example, if the communication channel is experiencing heavy use and the airtime required by the Wi-Fi device 102 exceeds the remaining channel airtime, output of data by the Wi-Fi device 102 may be interrupted or irregular. In some cases, the Wi-Fi device 102 may begin providing the data at a lower quality, such as by outputting video data having a lower resolution.

Channel status data 110 indicative of the condition of the communication channel may be determined from one or more devices 102 within the network 202. For example, the channel status data 110 may indicate the airtime associated with current use of a Wi-Fi device 102. As another example, the channel status data 110 may indicate a count of unsuccessful access attempts 206 and a count of total access attempts 208 associated with the Wi-Fi device 102. Continuing this example, the ratio of unsuccessful access attempts 206 to total access attempts 208 may indicate a level of use, congestion, noise, and so forth, associated with the communication channel. For example, if multiple other devices 102 are currently using the majority of a communication channel's resources or if the communication channel is affected by noise from one or more sources, a larger percentage of access attempts by a device 102 may be unsuccessful. Based on the channel status data 110 and one or more status algorithms 218, a control server 108 may generate a channel status determination 114 indicative of the relationship between at least a portion of the channel status data 110 and one or more threshold values 116. For example, the channel status determination 114 may indicate that the current channel airtime used by a Wi-Fi device 102 exceeds a threshold value 116.

The control server 108 may generate channel status determinations 114 associated with a communication channel periodically or continuously. For example, the control server 108 may generate a channel status determination 114 once every one-hundred milliseconds. If a relationship between the channel status data 110 and a threshold value 116 persists for a threshold length of time, such as three-hundred milliseconds, the control server 108 may generate a control determination 120 configured to cause one or more devices 102 to modify one or more characteristics.

At 310, based on the channel status determination 114, the control server 108 may determine a manner in which the audio data rate for a second device 102(2) may be reduced. Reduction of the audio data rate may reduce the channel resources used by the second device 102(2). For example, the second device 102(2) may include a device 102 using a Bluetooth Low Energy protocol. Reduction of the audio data rate for a Bluetooth Low Energy device 102 from 256 kilobytes per second (kB/s) to 64 kB/s may reduce the airtime used by the device 102 by as much as 67%. Reduction of the audio data rate from 256 kB/s to 48 kB/s may reduce the airtime used by as much as 75%. Reduction of the audio data rate from 256 kB/s to 43 kB/s may reduce the airtime used by as much as 80%. The audio data rate for the second device 102(2) may be influenced by one or more of the sampling frequency, the bit depth, or the compression ratio associated with the transmission of audio data by the device 102(2). For example, device data 122 in communication with the control server 108 may include a look-up table indicating values for one or more of the sampling frequency, bit depth, or compression ratio that may be used to provide the second device 102(2) with particular target audio data rates. Continuing the example, the device data 122 may include associating an audio data rate of 256 kbps with various parameters, such as a sampling frequency of 16 kHz, a bit depth of 16 bits, and a compression ratio of 1:1. As another example, the device data 122 may associate an audio data rate of 64 kbps with a sampling frequency of 16 kHz, a bit depth of 16 bits, and a compression ratio of 4:1. One or more control algorithms 220 may indicate a manner in which the audio data rate of the second device 102(2) may be modified based on the relationship between the channel status data 110 and the threshold values 116. Based on the control algorithms 220, the device data 122, and the channel status determination 114, the control server 108 may generate a control determination 120 indicative of a manner in which the audio data rate for the second device 102(2) may be changed to reduce the channel airtime used by the second device 102(2). For example, based on the relationship between the channel status data 110 and the threshold values 116, the control determination 120 may indicate a manner in which the audio data rate of the second device 102(2) may be reduced from 64 k to 43 k, such as by changing the compression ratio of the second device 102(2) from 4:1 to 6:1.

At 312, the audio data rate of the second device 102(2) may be reduced, such as by providing one or more control signals, instructions, or recommendations to one or more devices 102 within the network 202. Reduction of the audio data rate for the second device 102(2) may increase the channel resources available for use by the first device 102(1), which may reduce or prevent degradation in the user experience associated with the first device 102(1).

Figure 4:
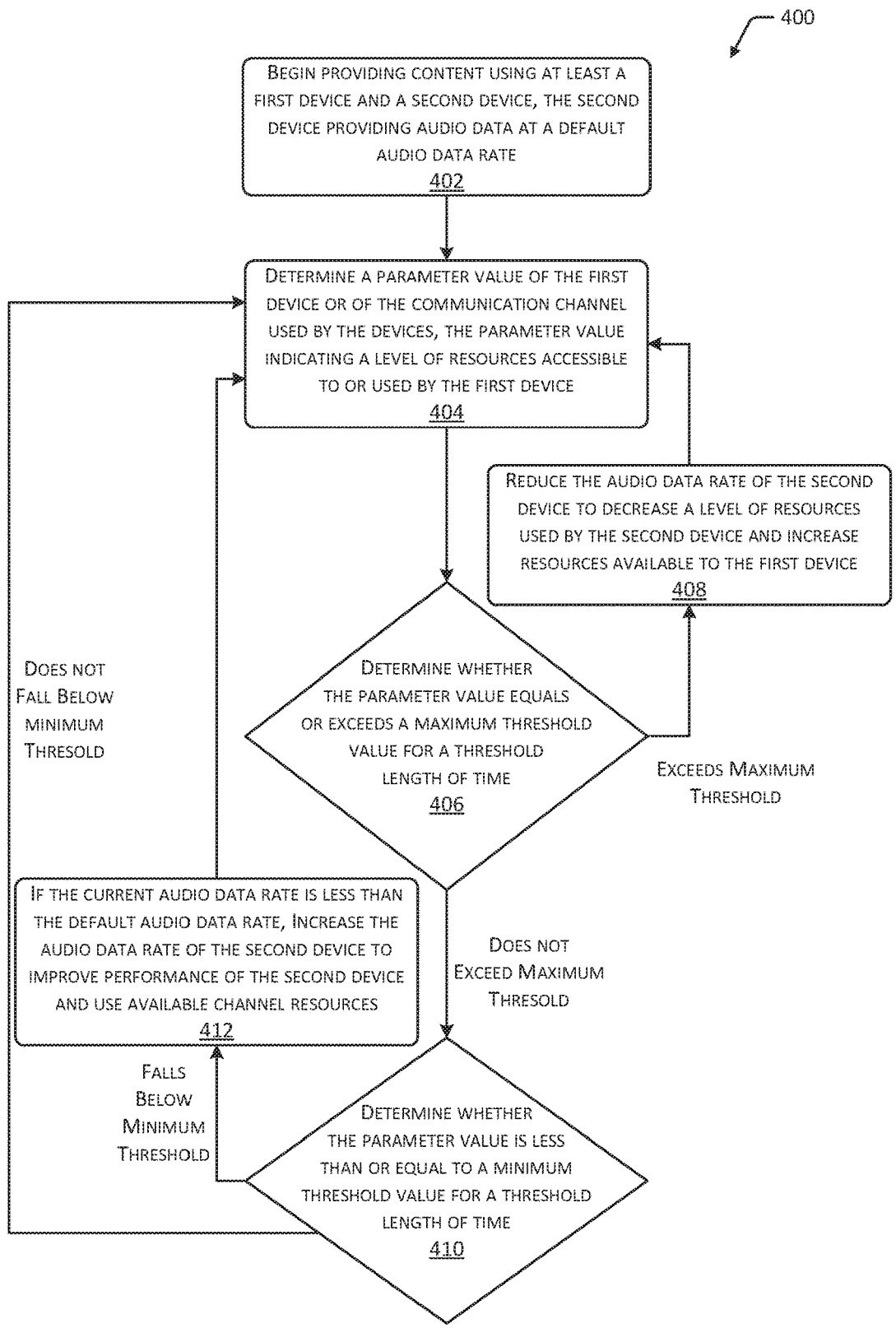
FIG. 4 is a flow diagram illustrating a method for modifying the audio data rate of a device based on the relationship between parameter values of a communication channel and threshold values.

FIG. 4 is a flow diagram 400 illustrating a method for modifying the audio data rate of a device 102 based on the relationship between parameter values of a communication channel and threshold values 116. Block 402 begins providing content 106 using at least a first device 102(1) and a second device 102(2). The second device 102(2) may provide audio data at a default audio data rate. For example, the first device 102(1) may use a Wi-Fi protocol to provide audio data, video data, alphanumeric data, and so forth, and the second device 102(2) may use a Bluetooth Low Energy protocol to provide audio data at a default audio data rate of 64 kB/s. Continuing the example, the second device 102(2) may provide audio data with a sampling frequency of 16 kilohertz, a bit depth of 16 bits, and a compression ratio of 4:1. Other implementations may include other default audio data rates. In some implementations, block 402 may include determining the default audio rate based on one or more factors affecting the device(s) 102 or the communication channel. For example, during periods of high noise or channel congestion that may interfere with receipt of audio data from the second device 102(2), the default audio data rate may be larger than times when noise or other factors do not negatively impact the ability of the second device 102(2) to receive and process the audio data. Continuing the example, the default audio data rate may be determined based on a look-up table or other data structure that associates default audio data rates with current signal-to-noise ratios for audio signals provided by the second device 102(2). As another example, the second device 102(2) may include a voice operated remote control that communicates with a speech recognition server or other computing device to process voice commands provided by a user. Data received from the speech recognition server may be used to determine the default audio data rate. Continuing the example, certain voice characteristics of a particular user, such as volume, annunciation, or rate of speech, may negatively impact the ability to process audio data provided by that user, which may result in a larger default audio data rate for that user compared to other users having different voice characteristics.

Block 404 determines a parameter value of the first device 102(1) or of the communication channel that is used by the devices 102. The parameter value may indicate a level of resources accessible to or used by the first device 102(1). For example, the parameter value may include an amount of channel airtime available for use by the first device 102(1). As another example, the parameter value may include a quantity of airtime used by the first device 102(1), determined based on channel status data 110 and one or more status algorithms 218. Continuing the example, as described with regard to FIG. 2, a status algorithm 218 may be used to determine airtime associated with use of the first device 102(1) based on the video data rate 204, data throughput factor 212, physical data rate 210, count of unsuccessful access attempts 206, count of total access attempts 208, and packet error rate 214 for the first device 102(1). As yet another example, the parameter value may include a count of unsuccessful access attempts 206 by the first device 102(1), which may be determined from a clear channel access register or other type of channel status data 110. Continuing the example, a large count of unsuccessful access attempts 206 may indicate that a smaller quantity of resources is available to the first device 102(1), while a small count of unsuccessful access attempts 206 may indicate that a larger quantity of resources is available to the first device 102(1).

Block 406 determines whether the parameter value equals or exceeds a maximum threshold value 116 for a threshold length of time. For example, the determination of the parameter value may be determined periodically, such as once every one-hundred milliseconds. The threshold length of time may include a temporal measurement or may be expressed as a number of times a parameter value is determined to be in excess of the maximum threshold value 116. For example, if the parameter value exceeds a maximum threshold value 116 for three sequential determinations of the parameter value, this may indicate that the parameter value has exceeded the threshold value 116 for three-hundred milliseconds. In other implementations, the threshold length of time may include a count of instances that the parameter value is determined to equal or exceed the threshold value during a time period. For example, if the parameter value exceeds the maximum threshold value 116 during three instances within an hour, this may exceed the threshold count of instances, independent of whether the three instances were sequential.

If the parameter value equals or exceeds the maximum threshold value 116, block 408 may reduce the audio data rate of the second device 102(2) to decrease a level of resources used by the second device 102(2). Use of a lower level of resources by the second device 102(2) may increase the resources available to the first device 102(1). Reduction of the audio data rate of the second device 102(2) may include reducing the sampling frequency or the bit depth associated with the transmission of audio data by the second device 102(2). In other implementations, reduction of the audio data rate may include increasing the compression ratio associated with transmission of audio data by the second device 102(2). The manner in which the audio data rate is reduced may be determined based on device data 122 associated with the second device 102(2). In some implementations, the manner in which the audio data rate is reduced may be determined based on the relationship between the parameter value and the threshold value 116, based on one or more control algorithms 220. For example, if the parameter value exceeds the threshold value 116 by a first quantity, the audio data rate may be reduced by a first amount. If the parameter value exceeds the threshold value 116 by a second quantity greater than the first quantity, the audio data rate may be reduced by a second amount greater than the first amount.

If the parameter value does not equal or exceed the maximum threshold value 116, block 410 may determine whether the parameter value is less than or equal to a minimum threshold value 116 for a threshold length of time. For example, if the parameter value falls blow a minimum threshold value 116, this may indicate that the available resources of a communication channel exceed the resources used by the first device 102(1) to provide content 106. Based on this determination, the audio data rate of the second device 102(2) may be increased to improve the performance thereof.

Block 412 may increase the audio data rate of the second device 102(2) to improve performance of the second device 102(2), if the current audio data rate of the second device 102(2) is less than the default audio data rate determined in block 402. For example, block 412 may determine whether the current audio data rate of the second device 102(2) is less than the default audio data rate. If the current audio data rate is equal to the default audio data rate, then increasing the audio data rate of the second device 102(2) may not significantly improve performance of the second device 102(2). However, if the current audio data rate is less than the default audio data rate, increasing the audio data rate may improve performance of the second device 102(2). Increasing the audio data rate may use the available channel resources not currently used by the first device 102(1) or other devices 102 that access the communication channel. In some implementations, the manner in which the audio data rate is increased may be determined based on device data 122 and the relationship between the parameter value and the minimum threshold value 116. For example, one or more control algorithms 220 may indicate that the amount by which the audio data rate of the second device 102(2) is increased may depend on the quantity by which the minimum threshold value 116 exceeds the parameter value.

If the parameter value is not less than or equal to the minimum threshold value 116, the process may continue at block 404, and the parameter value may be determined again. The parameter value of the first device 102(1) or of the communication channel may be determined periodically, such as once every one-hundred milliseconds or other time period, or continuously.

Figure 5:
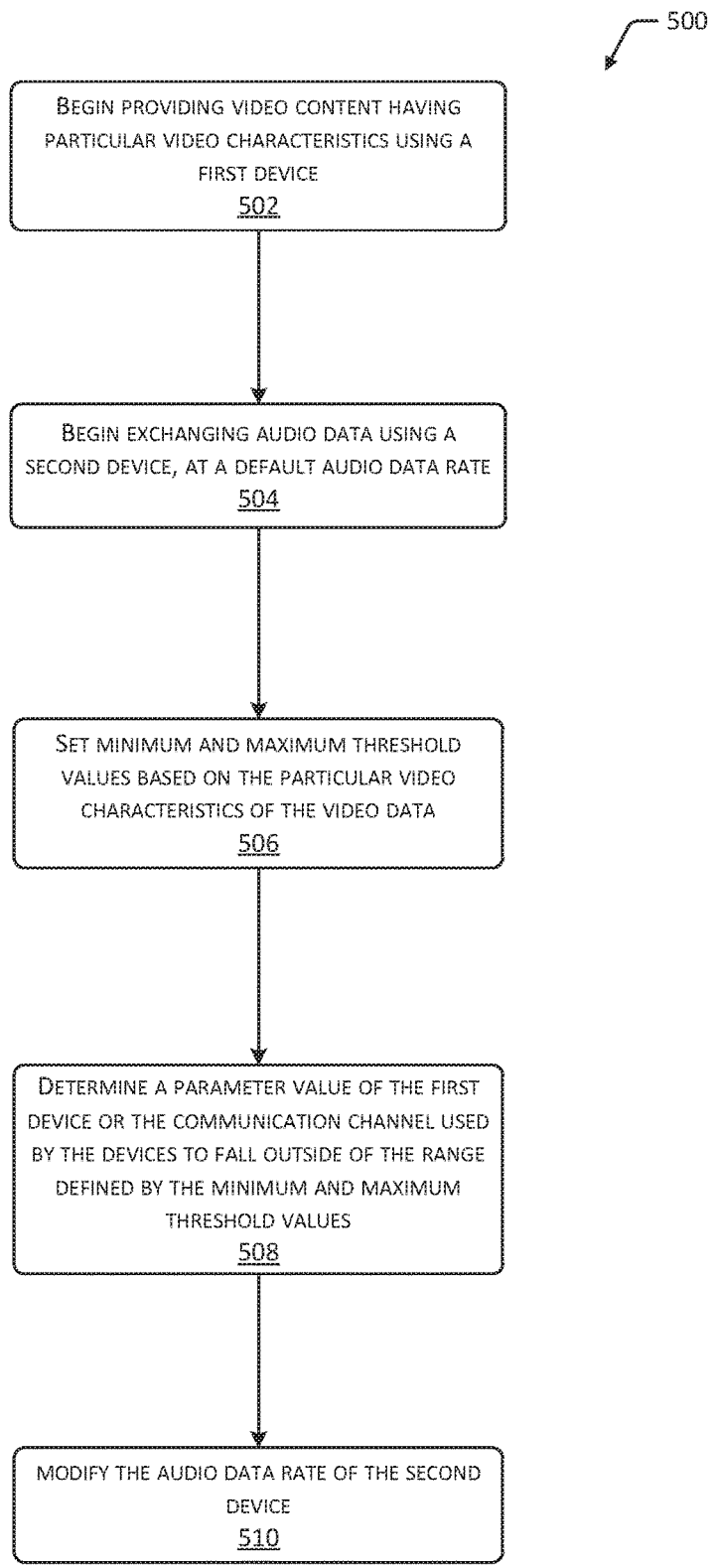
FIG. 5 is a flow diagram illustrating a method for determining threshold values based on characteristics of data provided by one or more devices.

FIG. 5 is a flow diagram 500 illustrating an example method for determining threshold values 116 based on characteristics of data provided by one or more devices 102. Block 502 may begin providing video content 106 using a first device 102(1). In the depicted example, the first device 102(1) may provide video data having particular video characteristics, such as a data rate, a resolution, and so forth. Block 504 may begin exchanging audio data using a second device 102(2), at a default audio rate. For example, as described with regard to FIG. 1, the first device 102(1) may include a smart television that receives video content 106 from a content server 304 and provides video output to a user. The first device 102(1) may operate using a Wi-Fi protocol. The second device 102(2) may include a voice remote controller or another type of device 102 configured to transmit audio data. The second device 102(2) may operate using a Bluetooth Low Energy protocol.

Block 506 sets minimum and maximum threshold values 116 based on the particular video characteristics of the video data. For example, if the first device 102(1) is providing video output having a resolution of 1080p, the determined maximum threshold value 116 may be smaller than the maximum threshold value 116 that corresponds to video output having a resolution of 720p. Continuing the example, output of video content 106 having a greater resolution may use a larger quantity of communication channel resources than output of video content 106 having a lesser resolution. Therefore, a smaller threshold value 116, used in conjunction with video output having a 1080p resolution, may be exceeded more often, which may cause a reduction in the audio data rate of other devices 102 and reduce the channel resources used by the other devices 102, thereby increasing the channel airtime available to the first device 102(1). Conversely, a larger threshold value 116, used in conjunction with video output having a 720p resolution, may not be exceeded as often, which may restrict the channel resources available to the first device 102(1) due to use of the resources by other devices 102.

In some implementations, the threshold values 116 may be dynamically changed. For example, as video characteristics or conditions of the communication channel or first device 102(1) change, the threshold values 116 may be modified. In other implementations, the threshold values 116 may be modified using one or more machine learning algorithms. For example, if performance of one or more devices 102 is negatively affected under a particular set of conditions, this may cause one or more existing threshold values 116 to be decreased on subsequent instances when the particular conditions are determined.

Block 508 determine a parameter value of the first device 102(1) or the communication channel used by the devices 102 to fall outside of the range defined by the minimum and maximum threshold values 116. For example, a difference between the parameter value and a threshold value 116 may be determined. In some implementations, the parameter values and threshold values 116 may not necessarily include data understandable to a human user, such as alphanumeric data, but may instead include machine-readable data that may be interpreted by a computing device. Based on correspondence between the parameter value and the threshold values 116, a control determination 120 may be generated to cause the audio data rate of the second device 102(2) to be modified. Alternatively, if the parameter value does not deviate from one or more threshold values 116, the audio data rate of the second device 102(2) may be maintained.

Block 510 modifies the audio data rate of the second device 102(2) based on the correspondence between the threshold value(s) 116 and the parameter value. Modification of the audio data rate may include changing one or more of the sampling frequency, bit depth, or compression ratio of audio data transmitted by the second device 102(2). Reduction of the audio data rate of the second device 102(2) may decrease the channel resources used by the second device 102(2), which may increase the resources available for use by the first device 102(1). Alternatively, when the first device 102(1) is not using a large quantity of channel resources, the audio data rate of the second device 102(2) may be increased to improve performance thereof.

Figure 6:
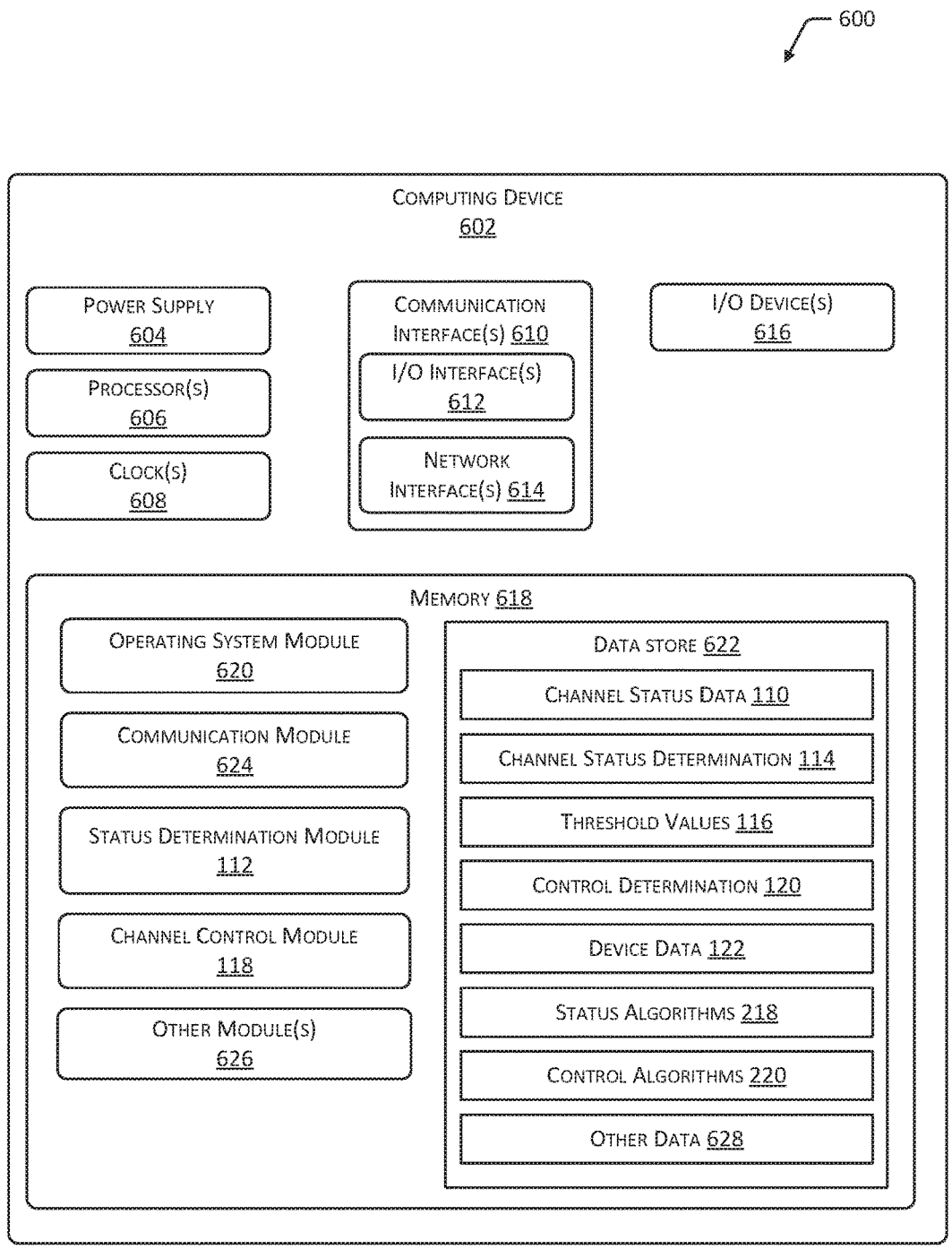
FIG. 6 is a block diagram depicting a computing device within the scope of the present disclosure.

FIG. 6 is a block diagram 600 depicting a computing device 602 within the scope of the present disclosure. The computing device 602 may include one or more control servers 108 or other computing devices 602, such as content servers 304, networked devices 102, and so forth in communication therewith. In other implementations, one or more of the functions described with regard to the control server(s) 108 may be performed by one or more of the devices 102 associated with a network 202, one or more content servers 304, or other computing devices 602 in communication therewith, and use of a separate control server 108 may be omitted.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock 608 to generate a timestamp, trigger a preprogrammed action, and so forth. Continuing the example, data from the clock 608 may be used to determine when a status of a communication channel or one or more devices 102 may be determined, whether a particular threshold value 116 has been exceeded for a threshold length of time, and so forth.

The computing device 602 may include one or more communication interfaces 610, such as input/output (I/O) interfaces 612, network interfaces 614, and so forth. The communication interfaces 610 may enable the computing device 602, or components of the computing device 602, to communicate with other computing devices 602 or components thereof. The I/O interfaces 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O devices 616. The I/O devices 616 may include any manner of input device or output device associated with the computing device 602 or with another computing device 602 in communication therewith. For example, I/O devices 616 may include touch sensors, keyboards, mouse devices, microphones, image sensors (e.g., cameras), scanners, displays, speakers, haptic devices, printers, and so forth. In some implementations, the I/O devices 616 may be physically incorporated with a computing device 602 or may be externally placed.

The network interfaces 614 may be configured to provide communications between the computing device 602 and other devices, such as the I/O devices 616, routers, access points 104, and so forth. The network interfaces 614 may include devices configured to couple to one or more networks 202 including local area networks (LANs), wireless LANs, wide area networks (WANs), wireless WANs, and so forth. For example, the network interfaces 614 may include computing devices 602 compatible with Ethernet, Wi-Fi, Bluetooth, ZigBee, Z-Wave, 3G, 4G, LTE, and so forth.

The computing device 602 may include one or more busses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 622 and one or more of the following modules may also be stored in the memory 618. The modules may be executed as foreground applications, background tasks, daemons, and so forth. The data store 622 may use a flat file, database, linked list, tree, executable code, script, or other data structure to store information. In some implementations, the data store 622 or a portion of the data store 622 may be distributed across one or more other devices 102 including other computing devices 602, network attached storage devices, and so forth.

A communication module 624 stored in the memory 618 may be configured to establish communications with devices 102, access points 104, control servers 108, content servers 304, or other computing devices 602.

The memory 618 may also store the status determination module 112. The status determination module 112 may determine various parameters associated with devices 102, access points 104, communication channels, and so forth. For example, the status determination module 112 may determine channel status data 110 associated with a network 202 or with particular devices 102 within the network 202. Channel status data 110 may include data rates associated with content 106, such as a video data rate 204 for video content 106, an audio data rate for audio content 106, and so forth. Channel status data 110 may also include a count of unsuccessful attempts 206 to access a communication channel by a device 102, a total count of access attempts 208 to access a communication channel by a device 102, a physical data rate 210 of one or more devices 102, data throughput factors 212 associated with devices 102, error rates (such as packet error rates 214) of the devices 102, and so forth.

Based on at least a portion of the channel status data 110, the status determination module 112 may generate a channel status determination 114 indicative of the relationship between particular portions of the channel status data 110, or values determined form the channel status data 110, and one or more threshold values 116. For example, the channel status determination 114 may indicate whether a determined parameter exceeds a maximum threshold value 116, falls below a minimum threshold value 116, and so forth. The channel status determination 114 may be generated based on one or more status algorithms 218. For example, a status algorithm 218 may indicate a manner in which the channel airtime or other channel resources used by a device 102 at a particular time may be determined based on the channel status data 110. Other status algorithms 218 may indicate a manner in which the ratio of the count of unsuccessful access attempts 206 of a device 102 to the count of total access attempts 208 of the device 102 may be determined and used to generate the channel status determination 114.

The memory 618 may additionally store the channel control module 118. The channel control module 118 may generate a control determination 120 based on the channel status determination 114. The control determination 120 may indicate a manner in which the audio data rate of a device 102 may be modified to reduce channel resources used by that device 102. For example, the channel status determination 114 may indicate that the channel resources available to a first device 102(1) are insufficient for the provision of content 106 by the first device 102(1). The control determination 120 generated by the channel control module 118 may cause the modification of an audio data rate associated with a second device 102(2) to reduce the channel resources used by the second device 102(2) and increase the channel resources available to the first device 102(1).

The control determination 120 may be generated based on device data 122 indicative of the manner in which parameters of a device 102 may be modified to change the audio data rate thereof. In one implementation, device data 122 may include a look-up table that associates sets of parameters, such as a sampling frequency, bit depth, and compression ratio, with corresponding audio data rates. Modification of the audio data rate may include changing the sampling frequency, bit depth, and compression ratio associated with a device 102 to other values, indicated in the look-up table. The control determination 120 may also be generated based on one or more control algorithms 220. The control algorithms 220 may indicate the manner in which the audio data rate of a device 102 may be changed based on the relationship between the channel status data 110 and particular threshold values 116. For example, the amount by which an audio data rate is changed may be based at least in part on the amount by which a measured parameter of a device 102 or communication channel deviates from a threshold value 116.

Other modules 626 may also be present in the memory 618. For example, encryption modules may be used to encrypt and decrypt communications between computing devices 602. The other modules 626 may also include modules for receiving user input to configure parameters of devices 102, set threshold values 116, modify device data 122, and so forth. Other modules 626 may further include machine learning modules configured to dynamically modify threshold values 116 based on determined parameters of communication channels and devices 102.

Other data 628 within the data store 622 may include user input data, such as configurations and settings associated with computing devices 602. Other data 628 may also include security data, such as encryption keys and schema, access credentials, and so forth.

In different implementations, different computing devices 602 may have different capabilities or capacities. For example, control servers 108 may have significantly more processor 606 capability and memory 618 capacity compared to the processor 606 capability and memory 618 capacity of devices 102 associated with a network 202.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
    a first device configured to communicate via a communication channel using a first wireless protocol;
    a second device configured to communicate via the communication channel using a second wireless protocol;
    one or more memories storing computer-executable instructions; and
    one or more hardware processors to execute the computer-executable instructions to:
        determine, at a first time, a first quantity of airtime of the communication channel corresponding to activity of the first device;
        determine that the first quantity of airtime exceeds a maximum threshold value;

determine, based on data received from a computing device in communication with the second device, a threshold data rate associated with processing of voice commands by the computing device; and based on the threshold data rate, decrease airtime used by the second device and increase airtime available for use by the first device by decreasing an audio data rate associated with audio data transmitted by the second device from a first audio data rate to a second audio data rate, wherein the second audio data rate is greater than the threshold data rate to enable the processing of voice commands by the computing device.

2. The system of claim 1, further comprising:

a third device configured to communicate via the communication channel using a third wireless protocol, wherein the first wireless protocol includes a protocol compliant with at least a portion of IEEE specification 802.11, the second wireless protocol includes a protocol compliant with at least a portion of one or more of IEEE specification 802.15.1 or a standard as promulgated by the Bluetooth Special Interest Group, and the third wireless protocol includes a protocol compliant with at least a portion of one or more of IEEE specification 802.15.1 or a standard as promulgated by the Bluetooth Special Interest Group; and computer-executable instructions to determine one or more of:
  a second quantity of airtime of the communication channel associated with activity of the second device;
  a third quantity of airtime of the communication channel associated with activity of the third device;
  a fourth quantity of airtime associated with a first switching time for transitioning between access of the first device to the communication channel and access of one or more of the second device or the third device to the communication channel; or
  a fifth quantity of airtime associated with a second switching time for transitioning between access of the one or more of the second device or the third device to the communication channel and access of the first device to the communication channel;

wherein the maximum threshold value is determined based on the one or more of the second quantity of airtime, the third quantity of airtime, the fourth quantity of airtime, or the fifth quantity of airtime.

3. The system of claim 2, further comprising computer-executable instructions to:
  determine a total airtime based on a sum of the first quantity of airtime, the second quantity of airtime, the third quantity of airtime, the fourth quantity of airtime, and the fifth quantity of airtime; and
  set the maximum threshold value based on a selected portion of the total airtime associated with activity of the first device.

4. The system of claim 1, further comprising computer-executable instructions to modify one or more of: a compression ratio, a sampling frequency, or a count of bits per sample associated with the audio data transmitted by the second device to decrease the audio data rate associated with the second device.

5. The system of claim 1, further comprising computer-executable instructions to:
  determine one or more of:
    a video data rate associated with the first device;
    a count of unsuccessful attempts to access the communication channel by the first device;
    a total count of attempts to access the communication channel by the first device;
    a physical data rate associated with the first device;
    a throughput associated with the first device; or
    a packet error rate associated with the first device;
  wherein the determination of the first quantity of airtime of the communication channel associated with use of the first device is further based at least in part on the one or more of the video data rate, the count of unsuccessful attempts, the total count of attempts, the physical data rate, the throughput, or the packet error rate.

6. The system of claim 1, further comprising computer-executable instructions to:
  determine, at a second time subsequent to the first time, a second quantity of airtime of the communication channel associated with use of the first device to be less than or equal to a minimum threshold value; and
  increase the audio data rate associated with the second device from the second audio data rate to one or more of the first audio data rate or a third audio data rate greater than the second audio data rate.

7. The system of claim 1, further comprising:

a third device configured to communicate via the communication channel using a third wireless protocol, wherein the first wireless protocol includes a protocol compliant with at least a portion of Institute of Electrical and Electronics Engineers (IEEE) specification 802.11, the second wireless protocol includes a protocol compliant with at least a portion of one or more of IEEE specification 802.15.1 or a standard as promulgated by the Bluetooth Special Interest Group, and the third wireless protocol includes a protocol compliant with at least a portion of one or more of IEEE specification 802.15.1 or a standard promulgated by the Bluetooth Special Interest Group; and computer-executable instructions to:
  determine a second quantity of airtime associated with activity of the third device;
  determine a third quantity of airtime associated with switching between one or more of the first wireless protocol, the second wireless protocol, and the third wireless protocol; and
  modify the audio data rate of the second device based at least in part on a sum of the first quantity of airtime and the second quantity of airtime.

8. The system of claim 1, further comprising:

a third device configured to communicate via the communication channel using a third wireless protocol, wherein the first wireless protocol includes a protocol compliant with at least a portion of IEEE specification 802.11, the second wireless protocol includes a protocol compliant with at least a portion of one or more of IEEE specification 802.15.1 or a standard as promulgated by the Bluetooth Special Interest Group, and the third wireless protocol includes a protocol compliant with at least a portion of one or more of IEEE specification 802.15.1 or a standard as promulgated by the Bluetooth Special Interest Group; and computer-executable instructions to:
  determine a second quantity of airtime of the communication channel associated with activity of the third device;
  wherein the audio data rate of the second device is decreased based at least in part on the second quantity of airtime.

9. The system of claim 1, further comprising computer-executable instructions to: determine a video characteristic associated with data transmitted by the first device; and set the maximum threshold value based at least in part on the video characteristic.

10. The system of claim 1, further comprising computer-executable instructions to:
determine the ratio (RAA);
determine a video data rate (VDR) associated with the first device;
determine a physical data rate (PDR) associated with the first device;
determine a throughput (TH) associated with the first device; and
determine a packet error rate (PER) associated with the first device;
wherein the first quantity of airtime (AT) of the communication channel associated with use of the first device is determined based at least in part on the equation: $AT=VDR/[TH*(1-RAA)*(1+PER)]$.

11. A method comprising:
determining, at a first time, a quantity of airtime of a communication channel associated with activity of a first device, wherein the first device exchanges data using a first protocol;
determining correspondence between the quantity of airtime and a threshold value;
determining a threshold data rate that is associated with processing of voice commands by one or more of a second device that communicates via the communication channel using a second protocol or a computing device in communication with the second device; and
based at least in part on the correspondence between the quantity of airtime and the threshold value, and based at least in part on the threshold data rate, causing a modification from a first audio data rate associated with the second device to a second audio data rate, wherein modifying the first audio data rate changes a quantity of airtime used by the second device to one or more of:
increase performance of the second device by increasing the quantity of airtime used by the second device, or increase airtime available to the first device by decreasing the quantity of airtime used by the second device, and wherein the second audio data rate is greater than or equal to the threshold data rate to enable processing of voice commands by the one or more of the second device or the computing device.

12. The method of claim 11, wherein the second protocol includes a protocol compliant with at least a portion of one or more of IEEE specification 802.15.1 or a standard as promulgated by the Bluetooth Special Interest Group and causing the modification to the audio data rate includes one or more of:
changing a sampling frequency associated with audio data transmitted by the second device;
changing a count of bits per sample associated with the audio data transmitted by the second device; or
changing a compression ratio associated with the audio data transmitted by the second device.

13. The method of claim 11, further comprising:
accessing a lookup table associating one or more of a sampling frequency, a count of bits per sample, or a compression ratio for audio data transmitted by the second device with a corresponding audio data rate; and
determining a target audio data rate for the second device based at least in part on a difference between the quantity of airtime and the threshold value;
wherein modifying the audio data rate of the second device includes determining the target audio data rate indicated by the lookup table and modifying the one or more of the sampling frequency, the count of bits per sample, or the compression ratio of the second device based at least in part on the lookup table.

14. The method of claim 11, further comprising:
determining the ratio (RAA);
determining a video data rate (VDR) associated with the first device;
determining a physical data rate (PDR) associated with the first device;
determining a throughput (TH) associated with the first device; or
determining a packet error rate (PER) associated with the first device; and
determining the quantity of airtime (AT) of the communication channel associated with activity of the first device based at least in part on the equation: $AT=VDR/[TH*(1-RAA)*(1+PER)]$.

15. The method of claim 11, further comprising:
determining a signal-to-noise ratio associated with audio data transmitted by the second device; and
determining a target audio data rate based at least in part on the signal-to-noise ratio;
wherein causing the modification of the audio data rate of the second device includes changing the audio data rate of the second device to the target audio data rate.

16. The method of claim 15, further comprising:
receiving data from the computing device in communication with the second device; and
determining the threshold data rate based on the data from the computing device.

17. A system comprising:
a first device in communication with a network using a first protocol;
a second device in communication with the network using a second protocol;
one or more memories storing computer-executable instructions; and
one or more hardware processors to execute the computer-executable instructions to:
access channel access data indicative of a count of unsuccessful attempts by the first device to transmit or receive data and a total count of attempts by the first device to transmit or receive data;
determine, at a first time, a ratio of the count of unsuccessful attempts to the total count of attempts, the ratio indicative of a level of use associated with resources of the network;
determine that the ratio exceeds a maximum threshold value for the ratio;
determine a threshold data rate for the second device based on data received from a computing device that processes voice commands, wherein the threshold data rate is associated with the processing of voice commands by the computing device; and
in response to the ratio exceeding the maximum threshold value and based on the threshold data rate, increase a data compression ratio for data transmitted by the second device from a first data compression ratio to a second data compression ratio greater than the first data compression ratio;

wherein increasing the data compression ratio decreases an audio data rate for transmission of audio data by the second device from a first value to a second value that is less than the first value, the second value is greater than the threshold data rate to enable the processing of voice commands by the computing device, and decreasing the audio data rate of the second device increases availability of the resources of the network.

18. The system of claim 17, further comprising computer-executable instructions to:
based at least in part on the channel access data, determine at a second time that the ratio is less than a minimum threshold value for the ratio; and
increase resources used by the second device and improve performance of the second device by decreasing the data compression ratio of the second device from the second data compression ratio to the first data compression ratio, wherein decreasing the data compression ratio increases the audio data rate of the second device from the second value to the first value.

19. The system of claim 17, further comprising computer-executable instructions to decrease one or more of a sampling frequency or a count of bits per sample associated with transmission of audio data by the second device, wherein decreasing the one or more of the sampling frequency or the count of bits per sample further decreases the audio data rate of the second device.

20. The system of claim 17, further comprising computer-executable instructions to:
determine the ratio of the count of unsuccessful attempts to the total count of attempts (RAA);
determine a physical data rate (PDR) associated with the first device, the physical data rate based at least in part on a modulation and coding scheme associated with the first device;
determine a video data rate (VDR) associated with the first device;
determine a data throughput (TH) associated with the first device;
determine a packet error rate (PER) associated with the first device;
determine a value indicative of a quantity of airtime (AT) used by the first device based on the equation: $AT=VDR/[TH*(1-RAA)*(1+PER)]$; and
decrease the data compression ratio of the second device based in part on the value indicative of the quantity of airtime exceeding a threshold maximum value.

* * * * *